United States Patent
Song et al.

(10) Patent No.: US 9,551,905 B2
(45) Date of Patent: Jan. 24, 2017

(54) DISPLAY DEVICE

(71) Applicant: Samsung Display Co., Ltd., Yongin, Gyeonggi-Do (KR)

(72) Inventors: Hee Rim Song, Seoul (KR); Mee Hye Jung, Suwon-si (KR); Sang Uk Lim, Yongin-si (KR); Sang Jin Jeon, Suwon-si (KR)

(73) Assignee: Samsung Display Co., Ltd. (KR)

( * ) Notice: Subject to any disclaimer, the term of this patent is extended or adjusted under 35 U.S.C. 154(b) by 359 days.

(21) Appl. No.: 14/242,593

(22) Filed: Apr. 1, 2014

(65) Prior Publication Data

US 2015/0116620 A1    Apr. 30, 2015

(30) Foreign Application Priority Data

Oct. 28, 2013  (KR) .................... 10-2013-0128581

(51) Int. Cl.
*G02F 1/1343* (2006.01)
*G02F 1/1337* (2006.01)

(52) U.S. Cl.
CPC ... *G02F 1/134309* (2013.01); *G02F 1/133707* (2013.01); *G02F 2001/134318* (2013.01); *G02F 2001/134345* (2013.01)

(58) Field of Classification Search
CPC ..................... G02F 1/134309; G02F 1/136286
USPC ....................................................... 349/129
See application file for complete search history.

(56) References Cited

U.S. PATENT DOCUMENTS

2013/0002625 A1 *   1/2013  Liao ................. G02F 1/134309
                                                           345/205

FOREIGN PATENT DOCUMENTS

| JP | 2002-196334 | 7/2002 |
|---|---|---|
| JP | 2005-018098 | 1/2005 |
| KR | 10-2008-0022355 A | 3/2008 |
| KR | 10-2009-0089655 A | 8/2009 |
| KR | 10-2009-0103461 A | 10/2009 |
| KR | 10-2009-0118391 A | 11/2009 |
| KR | 10-2010-0056613 A | 5/2010 |
| KR | 10-2012-0124012 A | 11/2012 |

* cited by examiner

*Primary Examiner* — Lucy Chien
(74) *Attorney, Agent, or Firm* — Innovation Counsel LLP

(57) ABSTRACT

A display device is provided that includes a first substrate, a gate wiring formed on the first substrate and extending in a first direction, a data wiring insulated from and crossing the gate wiring and extending in a second direction, and a pixel electrode including a first subpixel electrode to which a first data voltage is applied from the data wiring and a second subpixel electrode to which a second data voltage different from the first data voltage is applied from the data wiring, wherein the first subpixel electrode is surrounded by the second subpixel electrode, and the second subpixel electrode includes a plurality of slit patterns formed in portions thereof which are adjacent to the first subpixel electrode.

19 Claims, 15 Drawing Sheets

DISPLAY DEVICE

This application claims priority from Korean Patent Application No. 10-2013-0128581 filed on Oct. 28, 2013 in the Korean Intellectual Property Office, the disclosure of which is incorporated herein by reference in its entirety.

BACKGROUND OF THE INVENTION

1. Field of the Invention

The present invention relates to a display device.

2. Description of the Related Art

Display devices are devices that visually display data. Examples of the display devices include liquid crystal displays (LCDs), electrophoretic displays, organic light-emitting displays, inorganic electroluminescent (EL) displays, field emission displays, surface-conduction electron-emitter displays, plasma displays, and cathode ray displays.

Of the above display devices, LCDs are one of the most widely used types of display devices. Generally, an LCD includes a pair of display panels having electric field generating electrodes, such as pixel electrodes and common electrodes, and a liquid crystal layer interposed between the display panels. In an LCD, voltages are applied to electric field generating electrodes to generate an electric field. Accordingly, the liquid crystal molecules of a liquid crystal layer are aligned, and polarization of incident light is controlled. As a result, a desired image is displayed on the LCD.

In a vertical alignment (VA) mode LCD, liquid crystal molecules are arranged with the main director of the molecules being perpendicular to the upper and lower display panels when no electric field is applied to the liquid crystal molecules. VA mode LCDs are popular due to their high contrast ratios and wide standard viewing angles. However, a drawback of the VA mode LCD is that it may have relatively poor lateral visibility compared to frontal visibility. To overcome this drawback, each pixel may be partitioned into two subpixels, and a switching device may be formed in each subpixel. Then, a different voltage may be applied to each subpixel.

In such a conventional LCD, however, two subpixels to which different voltages are applied are separated from each other. Therefore, texture is created at a boundary between the two subpixels.

To prevent the creation of the texture, a gap between the two subpixels may be reduced. However, it is difficult to reduce the gap to below a certain level due to the limited process capability of current mass production facilities.

Alternatively, a voltage applied to one of the two subpixels may be reduced to prevent the creation of the texture. However, a reduction in the voltage inevitably results in a reduction in the luminance (i.e., light transmittance) of the display device.

SUMMARY OF THE INVENTION

A display device in which slit patterns or a sawtooth pattern is formed at a boundary between two subpixels to prevent the creation of texture at the boundary between the two subpixels is provided.

However, aspects of the present invention are not restricted to the one set forth herein. The above and other aspects will become more apparent to one of ordinary skill in the relevant art by referencing the detailed description given below.

According to an aspect, there is provided a display device including a first substrate, a gate wiring formed on the first substrate and extending in a first direction, a data wiring insulated from and crossing the gate wiring and extending in a second direction, and a pixel electrode including a first subpixel electrode to which a first data voltage is applied from the data wiring and a second subpixel electrode to which a second data voltage different from the first data voltage is applied from the data wiring, wherein the first subpixel electrode is surrounded by the second subpixel electrode, and the second subpixel electrode includes a plurality of slit patterns formed in portions thereof which are adjacent to the first subpixel electrode.

The slit patterns may substantially surround the first subpixel electrode.

The first data voltage may be higher than the second data voltage.

The pixel electrode may include a plurality of unit pixel electrodes, wherein the first subpixel electrode included in each of the unit pixel electrodes may include a first plate, a plurality of stems protruding from the first plate and a plurality of first branches protruding from the first plate and the stems, and the second subpixel electrode included in each of the unit pixel electrodes may include a second plate surrounding the first plate and a plurality of second branches protruding from the second plate on an outer side of the second plate opposite an inner side of the second plate adjacent the first plate.

The slit patterns may be disposed in portions of the second plate which are adjacent to the first branches.

A lengthwise direction of one of the slit patterns may be perpendicular to a direction in which first branches adjacent to the slit pattern protrude.

Each of the slit patterns may be shaped like a rectangle or a parallelogram.

An end of at least one of the slit patterns may be open.

The first plate may be diamond-shaped, the stems may protrude from corners of the first plate, and the first branches may be arranged at regular intervals to surround the first plate and the stems.

Two halves of the second plate may be symmetrical with respect to a virtual line that is parallel to the data wiring and passes through a center of the first plate, and the second branches may be arranged at regular intervals to surround the second plate.

The unit pixel electrodes may be arranged in a row in a direction parallel to the data wiring.

The pixel electrode may further include a plurality of connecting electrodes interposed between adjacent unit pixel electrodes, wherein the connecting electrodes may include a first connecting electrode interposed between adjacent stems, and a second connecting electrode interposed between adjacent second plates.

The display device may further include a second substrate facing the first substrate, a common electrode disposed on the second substrate, and a liquid crystal layer interposed between the first substrate and the second substrate, wherein the common electrode may include a plurality of unit common electrodes corresponding to the unit pixel electrodes, respectively, and each of the unit common electrodes may include a central hole overlapping the center of the first plate and a plurality of slits protruding from the central hole and overlapping the stems.

According to another aspect of the present invention, there is provided a display device including a first substrate, a gate wiring formed on the first substrate and extending in a first direction, a data wiring insulated from and crossing the gate wiring and extending in a second direction, and a pixel electrode including a plurality of unit pixel electrodes which are disposed in a region defined by the gate wiring and the data wiring, wherein each of the unit pixel electrodes includes a first subpixel electrode including a first plate, a plurality of stems which protrude from the first plate, and a plurality of first branches which protrude from the first plate and the stems, and a second subpixel electrode including a second plate which surrounds the first plate and a plurality of second branches which protrude from the second plate in a direction opposite to a direction in which the first plate is disposed, wherein a first data voltage is applied from the data wiring to the first subpixel electrode, a second data voltage different from the first data voltage is applied from the data wiring to the second subpixel electrode, and the second plate includes a plurality of slit patterns formed in portions thereof which are adjacent to the first branches.

The slit patterns may substantially surround the first subpixel electrode.

The first data voltage may be higher than the second data voltage.

According to still another aspect of the present invention, there is provided a display device including a first substrate, a gate wiring formed on the first substrate and extending in a first direction, a data wiring insulated from and crossing the gate wiring and extending in a second direction, and a pixel electrode including a first subpixel electrode to which a first data voltage is applied from the data wiring and a second subpixel electrode to which a second data voltage different from the first data voltage is applied from the data wiring, wherein the first subpixel electrode is surrounded by the second subpixel electrode, and the second subpixel electrode includes a sawtooth pattern formed in portions thereof which face the first subpixel electrode.

The first data voltage may be higher than the second data voltage.

The pixel electrode may include a plurality of unit pixel electrodes, wherein the first subpixel electrode included in each of the unit pixel electrodes may include a first plate, a plurality of stems protruding from the first plate and a plurality of first branches protruding from the first plate and the stems, and the second subpixel electrode included in each of the unit pixel electrodes may include a second plate surrounding the first plate and a plurality of second branches protruding from the second plate on an outer side of the second plate opposite an inner side of the second plate adjacent the first plate.

The sawtooth pattern may be disposed in portions of the second plate which are adjacent to the first branches.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF THE INVENTION

Figure 1:
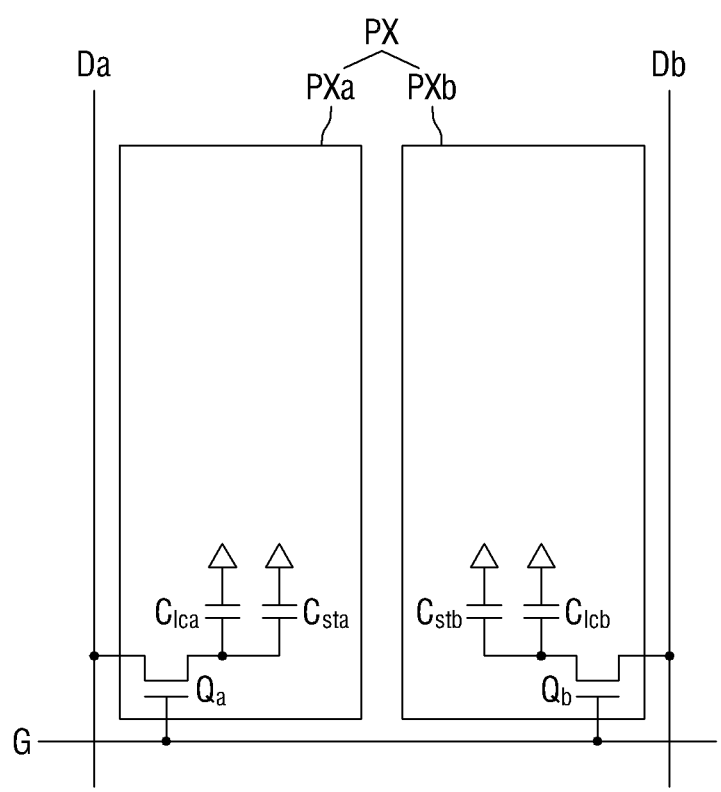
FIG. 1 is an equivalent circuit diagram of a pixel included in a display device according to an embodiment.

The aspects and features of the present disclosure and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are provided to assist those of ordinary skill in the art in understanding of the disclosure.

The term "on" is used to designate that an element is on another element or located on a different layer and includes both a case where an element is located directly on another element or a layer and a case where an element is located on another element via another layer or still another element. In the entire disclosure, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Display devices are devices that display images. Examples of the display devices include liquid crystal displays (LCDs), electrophoretic displays, organic light-emitting displays, inorganic electroluminescent (EL) displays, field emission displays, surface-conduction electron-emitter displays, plasma displays, and cathode ray displays.

Hereinafter, an LCD will be described as an example of a display device according to an embodiment of the present invention. However, the display device according to the present invention is not limited to the LCD, and various types of displays can be used.

The present invention will now be described more fully with reference to the accompanying drawings, in which example embodiments of the invention are shown.

FIG. 1 is an equivalent circuit diagram of a pixel PX included in a display device according to an embodiment.

Referring to FIG. 1, the display device according to the current embodiment may include (not shown) a panel assembly, a gate driver and a data driver connected to the panel assembly, a gray voltage generator connected to the data driver, and a signal controller controlling the panel assembly, the gate driver, the data driver, and the gray voltage generator.

Referring to FIG. 1, the panel assembly may include a plurality of display signal lines (G, Da, Db) and a plurality of pixels PX which are connected to the display signal lines (G, Da, Db) and arranged substantially in a matrix. The panel assembly may also include lower and upper display panels facing each other and a liquid crystal layer interposed between the lower and upper display panels.

The display signal lines (G, Da, Db) are formed on the lower display panel. The display signal lines (G, Da, Db) include a plurality of gate lines G for transmitting gate signals and a plurality of data lines Da and Db for transmitting data signals. The gate lines G extend substantially in a row direction and are substantially parallel to each other. The data lines Da and Db extend substantially in a column direction and are substantially parallel to each other.

Each pixel PX includes a pair of subpixels PXa and PXb. Each of the subpixels PXa and PXb includes a switching device Qa or Qb connected to the corresponding data line Da or Db and one gate line G, a liquid crystal capacitor Clca or Clcb connected to the switching device Qa or Qb, and optionally, a storage capacitor Csta or Cstb connected to the switching device Qa or Qb. In other words, two data lines Da and Db and one gate line G are allocated to a pair of subpixels PXa and PXb. At least one of the storage capacitors Csta and Cstb may be omitted when necessary.

The switching device Qa or Qb in each of the subpixels PXa and PXb may be a thin-film transistor formed on the lower display panel. Specifically, the switching device Qa or Qb may be a three-terminal device that includes a control terminal (hereinafter, referred to as a gate electrode) connected to the gate line G to which a gate signal is transmitted, an input terminal (hereinafter, referred to as a source electrode) connected to the data line Da or Db, and an output terminal (hereinafter, referred to as a drain electrode) connected to the liquid crystal capacitor Clca or Clcb and the storage capacitor Csta or Cstb.

The liquid crystal capacitor Clca or Clcb uses a subpixel electrode of the lower display panel and a common electrode of the upper display panel as two terminals. The liquid crystal layer between the subpixel electrode and the common electrode may function as a dielectric. A plurality of subpixel electrodes are connected to the switching devices Qa and Qb, respectively. The common electrode may be formed on the whole surface of the upper display panel, and a common voltage is applied to the common electrode. The common electrode may alternatively be formed on the lower display panel, in which case, at least one of the common electrode and the subpixel electrodes may have a linear or bar shape.

The storage capacitors Csta and Cstb supplement the liquid crystal capacitors Clca and Clcb. Each of the storage capacitors Csta and Cstb may be formed by the overlap of a storage wiring and a subpixel electrode, which are formed on the lower display panel, with an insulator therebetween. A predetermined voltage, such as the common voltage, is applied to the storage wiring.

Each pixel PX may display one of three primary colors (spatial division) or alternatively, may display the three primary colors at different times (time division) so that a spatio-temporal sum of the three primary colors can produce a desired color which can be recognized. The three primary colors may be red (R), green (G) and blue (B). As an example of spatial division, each pixel PX may include a color filter representing one of the three primary colors in a region of the upper display panel. In addition, the color filter may be formed on or under the subpixel electrodes of the lower display panel.

The gate driver is connected to the gate lines G and transmits a gate signal, i.e. a gate-on voltage Von or a gate-off voltage Voff, to the gate lines G.

The data driver is connected to each of a pair of the data lines Da and Db. The data driver applies a data voltage to any one of a pair of the subpixels PXa and PXb that form each pixel PX through the data line Da and applies a different data voltage to the other one of the subpixels PXa and PXb through the data line Db.

The gate driver or the data driver may be directly mounted on the panel assembly in the form of a plurality of driving integrated circuit (IC) chips or may be mounted on flexible printed circuit films and attached to the panel assembly in the form of tape carrier packages. Otherwise, the gate driver or the data driver may be integrated into the panel assembly together with the display signal lines, i.e., the gate lines G and the data lines Da and Db, and the switching devices Qa and Qb, i.e., the thin film transistors.

The gray voltage generator may generate two sets of gray voltages (or reference gray voltages) to be transmitted to the pixels PX and apply the generated sets of gray voltages to the data driver. In other words, the two sets of the gray voltages may be independently applied to each pair of subpixels PXa and PXb that form each pixel PX. However, the present disclosure is not limited thereto. The gray voltage generator may generate only one set of gray voltages.

The signal controller controls the operations of the gate driver and the data driver.

Hereinafter, the display device according to the example embodiment of FIG. 1 will be described in detail with reference to FIGS. 2 through 8. The display device according to the current example embodiment includes the lower display panel having a TFT array, the upper display panel facing the lower display panel, and the liquid crystal layer interposed between the lower and upper display panels.

Figure 2:
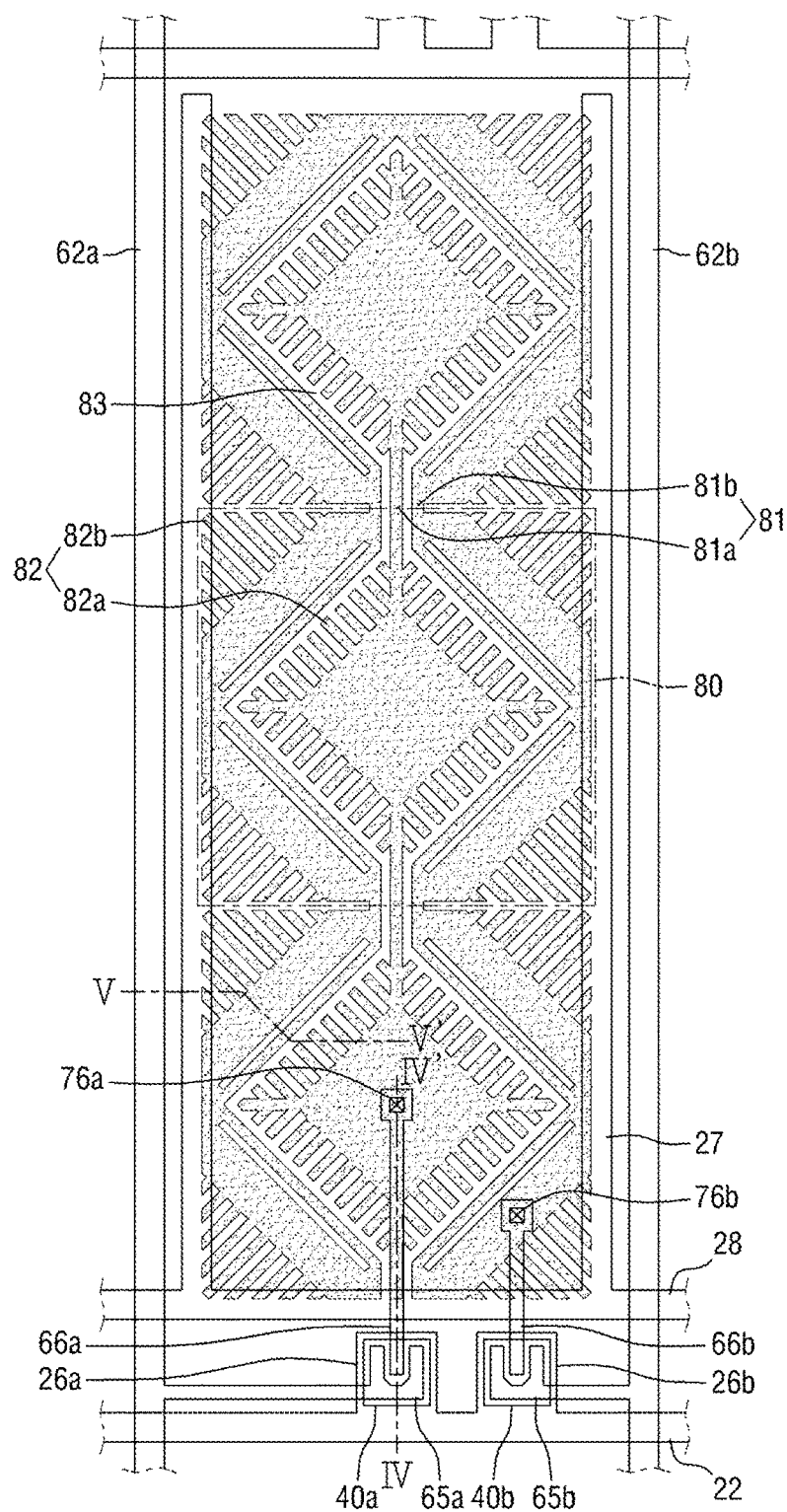
FIG. 2 is a layout diagram of a lower display panel including a pixel of the display device shown in FIG. 1.
Figure 3:
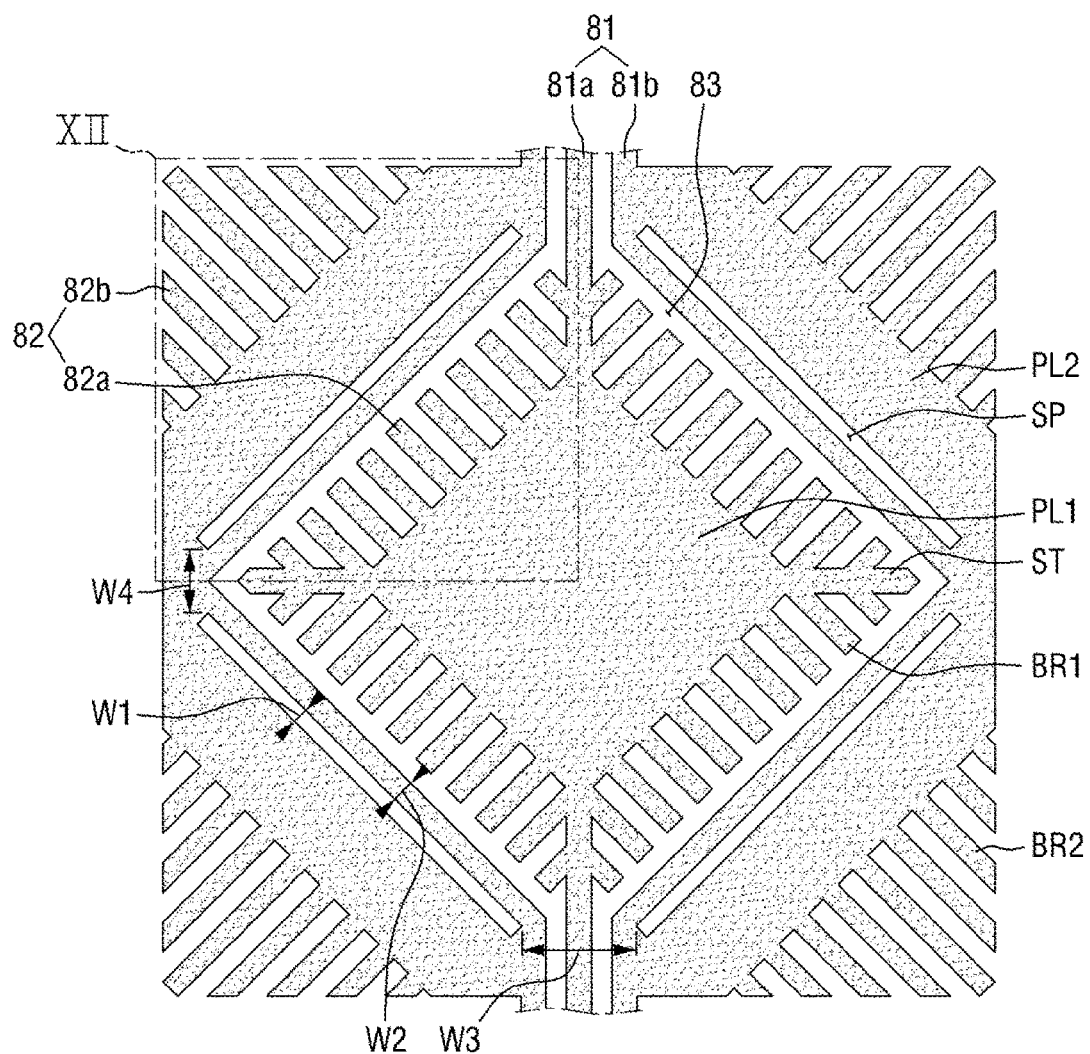
FIG. 3 is an enlarged view of a unit pixel electrode of the lower display panel shown in FIG. 2.
Figure 4:
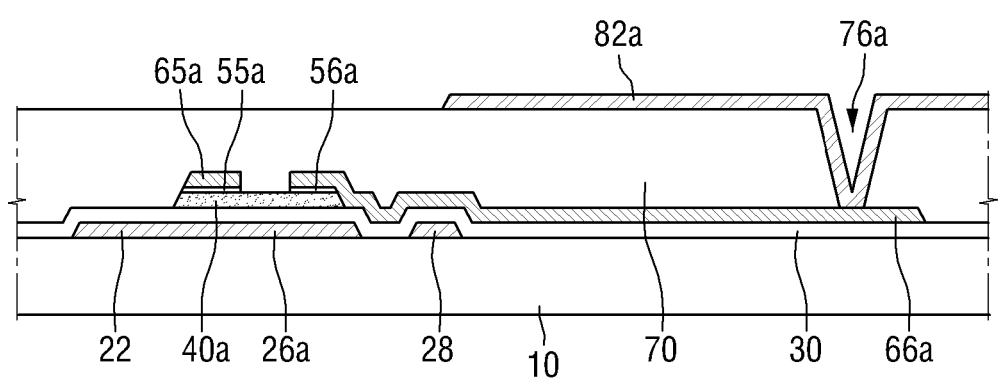
FIG. 4 is a cross-sectional view of the lower display panel taken along the line IV-IV' of FIG. 2.
Figure 5:
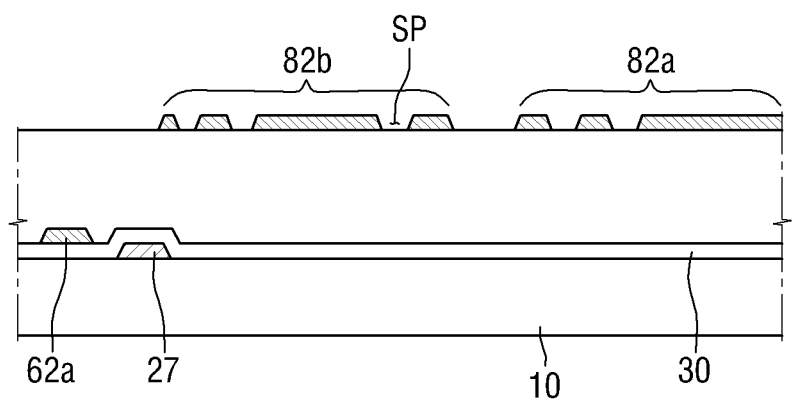
FIG. 5 is a cross-sectional view of the lower display panel taken along the line V-V' of FIG. 2.

The lower display panel of the display device according to the embodiment of FIG. 1 will now be described in detail with reference to FIGS. 2 through 5. FIG. 2 is a layout diagram of the lower display panel including a pixel of the display device shown in FIG. 1. FIG. 3 is an enlarged view of a unit pixel electrode 80 of the lower display panel shown in FIG. 2. FIG. 4 is a cross-sectional view of the lower display panel taken along the line IV-IV' of FIG. 2. FIG. 5 is a cross-sectional view of the lower display panel taken along the line V-V' of FIG. 2.

A gate line 22 is formed on a substrate 10 which may be formed of, for example, transparent glass. The gate line 22 generally extends in a horizontal direction and transmits a gate signal. The gate line 22 is connected to each pixel in the row. The gate line 22 includes a pair of first and second protruding gate electrodes 26a and 26b. The gate line 22 and the first and second gate electrodes 26a and 26b are referred to as gate wirings.

A storage line 28 is formed on the substrate 10. The storage line 28 generally extends across a pixel region in the horizontal direction to be substantially parallel to the gate line 22. In addition, storage electrodes 27 protrude perpendicularly from the storage line 28. In an example embodiment, the storage line 28 may be disposed parallel to the gate line 22 to partially overlap a lower edge of a pixel electrode 82, and the storage electrodes 27 may be disposed parallel to first and second data lines 62a and 62b to partially overlap left and right edges of the pixel electrode 82, respectively. Specifically, a portion of the storage line 28 may overlap a first subpixel electrode 82a and a second subpixel electrode 82b, and a portion of each of the storage electrodes 27 may overlap the second subpixel electrode 82b. However, the storage electrodes 27 may not overlap the first and second data lines 62a and 62b. The storage line 28 and each of the storage electrodes 27 partially overlap the pixel electrode 82 to form a storage capacitor which improves the charge storage capability of a pixel. The storage line 28 and the storage electrodes 27 are referred to as storage wirings. The shape and disposition of the storage wirings may vary.

The gate wirings (22, 26a, 26b) and the storage wirings (27, 28) may, for example, be formed of aluminum (Al)-based metal, such as aluminum and an aluminum alloy, silver (Ag)-based metal, such as silver and a silver alloy, copper (Cu)-based metal, such as copper and a copper alloy, molybdenum (Mo)-based metal, such as molybdenum and a molybdenum alloy, chrome (Cr), titanium (Ti) or tantalum (Ta). In addition, the gate wirings (22, 26a, 26b) and the storage wirings (27, 28) may have a multiple layer structure composed of two conductive layers (not shown) with different physical characteristics. One of the two conductive layers may be formed of metal with low resistivity, such as aluminum-based metal, silver-based metal or copper-based metal, in order to reduce a signal delay or a voltage drop of the gate wirings (22, 26a, 26b) and the storage wirings (27, 28). The other one of the conductive layers may be formed of a different material, in particular, a material having superior contact characteristics with indium tin oxide (ITO) and indium zinc oxide (IZO), such as molybdenum-based metal, chrome, titanium, or tantalum. Examples of multiple layer structures include a chrome lower layer with an aluminum upper layer and an aluminum lower layer with a molybdenum upper layer. However, the present disclosure is not limited thereto. The gate wirings (22, 26a, 26b) and the storage wirings (27, 28) may be formed of various metals and conductors. The gate wirings (22, 26a, 26b) and the storage wirings (27, 28) may be formed of the same material. In addition, the gate wirings (22, 26a, 26b) and the storage wirings (27, 28) may be formed simultaneously.

A gate insulating layer 30, which may, for example, be formed of silicon nitride (SiNx), may be disposed on the gate wirings (22, 26a, 26b) and the storage wirings (27, 28).

A pair of semiconductor layers 40a and 40b, which are formed, for example, of hydrogenated amorphous silicon, polycrystalline silicon or an oxide semiconductor, may be disposed on the gate insulating layer 30. The semiconductor layers 40a and 40b may have various shapes. For example, the semiconductor layers 40a and 40b may be islands or may be formed linearly. In the current example embodiment, the semiconductor layers 40a and 40b are islands.

Ohmic contact layers 55a and 56a formed of a material, such as silicide or n+ hydrogenated amorphous silicon doped with n-type impurities in high concentration, may be disposed on the semiconductor layers 40a and 40b, respectively. That is, a pair of the ohmic contact layers 55a and 56a may be formed on the semiconductor layers 40a and 40b, respectively.

A pair of the first and second data lines 62a and 62b and a pair of first and second drain electrodes 66a and 66b, corresponding to the first and second data lines 62a and 62b, respectively, are formed on the ohmic contact layers 55a and 56a and the gate insulating layer 30.

The first and second data lines 62a and 62b generally extend in the vertical direction, crossing the gate line 22 and the storage line 28, and transmit the data voltages to the first and second source electrodes 65a and 65b. First and second source electrodes 65a and 65b branch from the first and second data lines 62a and 62b and extend toward the first and second drain electrodes 66a and 66b, respectively. As shown in FIG. 3, a pixel is partitioned into a pair of subpixels, and the first data line 62a transmits a data signal to one of the subpixels, and the second data line 62b transmits another data signal to the other one of the subpixels. Specifically, the first data line 62a applies a first data voltage to the first subpixel electrode 82a, and the second data line 62b applies a second data voltage that is lower than the first data voltage to the second subpixel electrode 82b. Here, the first data voltage may be higher than the second data voltage.

The first and second data lines 62a and 62b, the first and second source electrodes 65a and 65b, and the first and second drain electrodes 66a and 66b are referred to as data wirings.

The data wirings (62a, 62b, 65a, 65b, 66a, 66b) may, for example, be formed of chrome, molybdenum-based metal, or refractory metal such as tantalum and titanium. In addition, the data wirings (62a, 62b, 65a, 65b, 66a, 66b) may have a multilayer structure composed of a lower layer, which is formed of refractory metal, and an upper layer, which is formed of a material with low resistivity and is disposed on the lower layer. Examples of the multiple layer structure include a chrome lower layer with an aluminum upper layer and an aluminum lower layer with a molybdenum upper layer. Alternatively, the multiple layer structure may be a three-layer structure having molybdenum-aluminum-molybdenum layers.

The first and second source electrodes 65a and 65b at least partially overlap the semiconductor layers 40a and 40b, respectively. In addition, the first and second drain electrodes 66a and 66b respectively face the first and second source electrodes 65a and 65b with respect to the gate electrodes 26a and 26b, and at least partially overlap the semiconductor layers 40a and 40b, respectively. The ohmic contact layers 55a and 56a described above may be arranged between the semiconductor layers 40a and 40b, which are disposed under the ohmic contact layers 55a and 56a, and the first and second source electrodes 65a and 65b and the first and second data lines 62a and 62b, which are disposed on top of the ohmic contact layers 55a and 56a. The ohmic contact layers 55a and 56a reduce contact resistance.

A passivation layer 70 may be formed on the data wirings (62a, 62b, 65a, 65b, 66a, 66b) and exposed portions of the semiconductor layers 40a and 40b. The passivation layer 70 may, for example, be formed of an inorganic material such as silicon nitride or silicon oxide, an organic material having photosensitivity and superior planarization characteristics, or a low-k insulating material formed by plasma enhanced chemical vapor deposition (PECVD), such as a-Si:C:O or a-Si:O:F. The passivation layer 70 may be composed of a lower inorganic layer and an upper organic layer in order to protect the exposed portions of the semiconductor layers 40a and 40*b* while taking advantage of the superior characteristics of an organic layer. Further, a red, green or blue color filter layer may be used as the passivation layer 70.

The first and second subpixel electrodes 82*a* and 82*b* may be formed on the passivation layer 70. The first and second subpixel electrodes 82*a* and 82*b* are electrically connected to the first and second drain electrodes 66*a* and 66*b* by first and second contact holes 76*a* and 76*b*, respectively, and are located in pixel regions. The first and second subpixel electrodes 82*a* and 82*b* may, for example, be formed of transparent conductors, such as ITO or IZO, or reflective conductors such as aluminum.

The first and second subpixel electrodes 82*a* and 82*b* are physically and electrically connected to the first and second drain electrodes 66*a* and 66*b* by the first and second contact holes 76*a* and 76*b*, respectively. Therefore, the first and second subpixel electrodes 82*a* and 82*b* may be supplied with different data voltages by the first and second drain electrodes 66*a* and 66*b*. Specifically, the first subpixel electrode 82*a* receives the first data voltage from the first drain electrode 66*a*, and the second subpixel electrode 82*b* receives the second data voltage lower than the first data voltage from the second drain electrode 66*b*. The first data voltage may be higher than the second data voltage.

The first subpixel electrode 82*a* may be surrounded by the second subpixel electrode 82*b*. In an example embodiment, the first subpixel electrode 82*a* may be located in the middle of a pixel region, and the second subpixel electrode 82*b* may be located on the edges of the pixel region. In this case, at least a corner of the first subpixel electrode 82*a* may be open, and the open corner of the first subpixel electrode 82*a* may face the gate line 22.

The second subpixel electrode 82*b* may include a plurality of slit patterns SP formed in its portions adjacent to the first subpixel electrode 82*a*. The slit patterns SP may substantially surround the first subpixel electrode 82*a*, that is, a majority of the first subpixel electrode 82*a* is surrounded by slit patterns SP in subpixel electrode 82*b*. The slit patterns SP will be described in greater detail below.

The first and second subpixel electrodes 82*a* and 82*b*, to which different data voltages are applied, generate an electric field together with the common electrode of the upper display panel, thereby determining the arrangement of liquid crystal molecules between the first and second subpixel electrodes 82*a* and 82*b* and the common electrode.

One pixel electrode 82 may include a plurality of unit pixel electrodes 80, which are portions of the pixel electrode 82. The unit pixel electrodes 80 may be arranged in a direction parallel to the data lines 62*a* and 62*b* in a pixel region. In the example embodiment of FIG. 2, the unit pixel electrodes 80 divide the pixel region into three domains. However, the present disclosure is not limited thereto. The unit pixel electrodes 80 may also divide the pixel region into two or four domains.

Specifically, referring to FIG. 3, one unit pixel electrode 80 may include the first subpixel electrode 82*a* and the second subpixel electrode 82*b*.

The first subpixel electrode 82*a* included in one unit pixel electrode 80 may include a first plate PL1, a plurality of stems ST, and a plurality of first branches BR1.

The first plate PL1 may be located in the middle of the unit pixel electrode 80. The first plate PL1 may be shaped like a quadrangular plate. That is, the first plate PL may not be patterned. In an example embodiment, the first plate PL may be diamond-shaped. A side of the first plate PL may be at an angle of approximately 45 or −45 degrees with respect to the gate line 22.

The stems ST may protrude from the first plate PL1. In an example embodiment, the stems ST may protrude from corners of the first plate PL1. Here, a direction in which the stems ST protrude may be substantially parallel to the gate line 22 or to the first and second data lines 62*a* and 62*b*. The stems ST may spread out in a radial pattern from a center of the first plate PL1. In addition, the stems ST may spread out in a cross pattern from the first plate PL1. In the example embodiment of FIGS. 2 and 3, the stems ST respectively protrude in upward, downward, right and left directions from the four corners of the first plate PL1. However, the present disclosure is not limited thereto.

The first branches BR I may protrude from the first plate PL1 and the stems ST. In an example embodiment, the first branches BR1 may be arranged at regular intervals so as to surround the first plate PL1 and the stems ST. The first branches BR1 may be at a predetermined angle with respect to the gate line 22. In an example embodiment, a plurality of first branches BR1 located in an upper right part of the unit pixel electrode 80 may be at an angle of approximately 45 degrees with respect to the gate line 22, a plurality of first branches BR1 located in an upper left part of the unit pixel electrode 80 may be at an angle of approximately 135 degrees with respect to the gate line 22, a plurality of first branches BR1 located in a lower left part of the unit pixel electrode 80 may be at an angle of approximately −135 degrees with respect to the gate line 22, and a plurality of first branches BR1 located in a lower right part of the unit pixel electrode 80 may be at an angle of approximately −45 degrees with respect to the gate line 22. A plurality of slits may be formed between the first branches BR1.

The second subpixel electrode 82*b* included in one unit pixel electrode 80 may include a second plate PL2 and a plurality of second branches BR2.

The second plate PL2 may surround the first plate PL1. In an example embodiment, the second plate PL2 may consist of four plates corresponding respectively to four sides of the first plate PL1. Two halves of the second plate PL2 may be symmetrical with respect to a virtual line that is parallel to the first and second data lines 62*a* and 62*b* and passes through the center of the first plate PL1. The first subpixel electrode 82*a* may be connected to a first connecting electrode 81*a* through the opening, as will be described later. In an example embodiment, while most of the second plates PL2 have openings positioned at the upper and lower corners of the first subpixel electrode 82*a*, a second plate PL2 located at the top of the pixel region may only have an opening at a lower corner of the first subpixel electrode 82*a*.

Unlike the first plate PL1, the second plate PL2 may be patterned. Specifically, the second plate PL2 may include the slit patterns SP. The slit patterns SP may be formed in portions of the second plate PL2 which are adjacent to the first branches BR1. That is, slit pattern SP may be formed in the second plate PL2 near an inner edge of the second play PL2 that is separated from the first branches BR1 of the first plate PL1 by a gap 83 (described below). A lengthwise direction of one of the slit patterns SP may be perpendicular to a direction in which a plurality of first branches BR1 adjacent to the slit pattern SP protrude. In addition, the lengthwise direction of one of the slit patterns SP may be parallel to a direction in which a side of the second plate PL2 adjacent to the slit pattern SP extends. One of the slit patterns SP may be longer than a side of the first plate PL1 which faces the slit pattern SP. In addition, each of the slit patterns SP may be, but are not limited to, rectangular.

A width W1 of each of the slit patterns SP, a distance W2 between each of the slit patterns SP and a side of the second plate PL2 which is adjacent to the first subpixel electrode 82a, and a distance W3 or W4 between two adjacent slit patterns SP can vary according to design conditions. That is, W1, W2, W3 and W4 can be adjusted to achieve optimum liquid crystal control and highest transmittance.

The second branches BR2 may protrude from the second plate PL2. The second branches BR2 may protrude in a direction aimed away from the first plate PL1. Specifically, the second branches BR2 may protrude toward the edges of the unit pixel electrode 80. The second branches BR2 may be arranged at regular intervals to surround the second plate PL2. In an example embodiment, a plurality of second branches BR2 located in the upper right part of the unit pixel electrode 80 may be at an angle of approximately 45 degrees with respect to the gate line 22, a plurality of second branches BR2 located in the upper left part of the unit pixel electrode 80 may be at an angle of approximately 135 degrees with respect to the gate line 22, a plurality of second branches BR2 located in the lower left part of the unit pixel electrode 80 may be at an angle of approximately −135 degrees with respect to the gate line 22, and a plurality of second branches BR2 located in the lower right part of the unit pixel electrode 80 may be at an angle of approximately −45 degrees with respect to the gate line 22. A plurality of slits may be formed between the second branches BR2.

One unit pixel electrode 80 may be divided into four domains. Specifically, one unit pixel electrode 80 may be divided into four domains, i.e., an upper right domain, an upper left domain, a lower left domain and a lower right domain. The arrangement of liquid crystals may be different in each of these four domains. In an example embodiment, an electric field applied to liquid crystals may cause the liquid crystals to be arranged in a direction oriented toward the center of the first plate PL1.

The unit pixel electrodes 80 may be connected to each other by a plurality of connecting electrodes 81. The connecting electrodes 81 may be interposed between two adjacent unit pixel electrodes 80.

The connecting electrodes 81 may include a first connecting electrode 81a and a second connecting electrode 81b.

The first connecting electrode 81a may be interposed between the stems ST of the first plates PL1 of two adjacent unit pixel electrodes 80. That is, the first connecting electrode 81a may connect the stems ST of the first plates PL1 of two adjacent unit pixel electrodes 80. The first connecting electrode 81 a may be located on a virtual line that is parallel to the first and second data lines 62a and 62b and passes through the center of the first plate PL1.

The second connecting electrode 81b may be interposed between the second plates PL2 of two adjacent unit pixel electrodes 80. That is, the second connecting electrode 81b may connect the second plates PL2 of two adjacent unit pixel electrodes 80. The second connecting electrode 8 lb may be located in regions that are adjacent to the virtual line that is parallel to the first and second data lines 62a and 62b and passes through the center of the first plate PL1.

A gap 83 may be formed between the first subpixel electrode 82a and the second subpixel electrode 82b. The first and second subpixel electrodes 82a and 82b may be electrically insulated from each other by the gap 83.

An alignment layer (not shown) which can align the liquid crystal layer may be coated onto the first and second subpixel electrodes 82a and 82b and the passivation layer 70.

Figure 6:
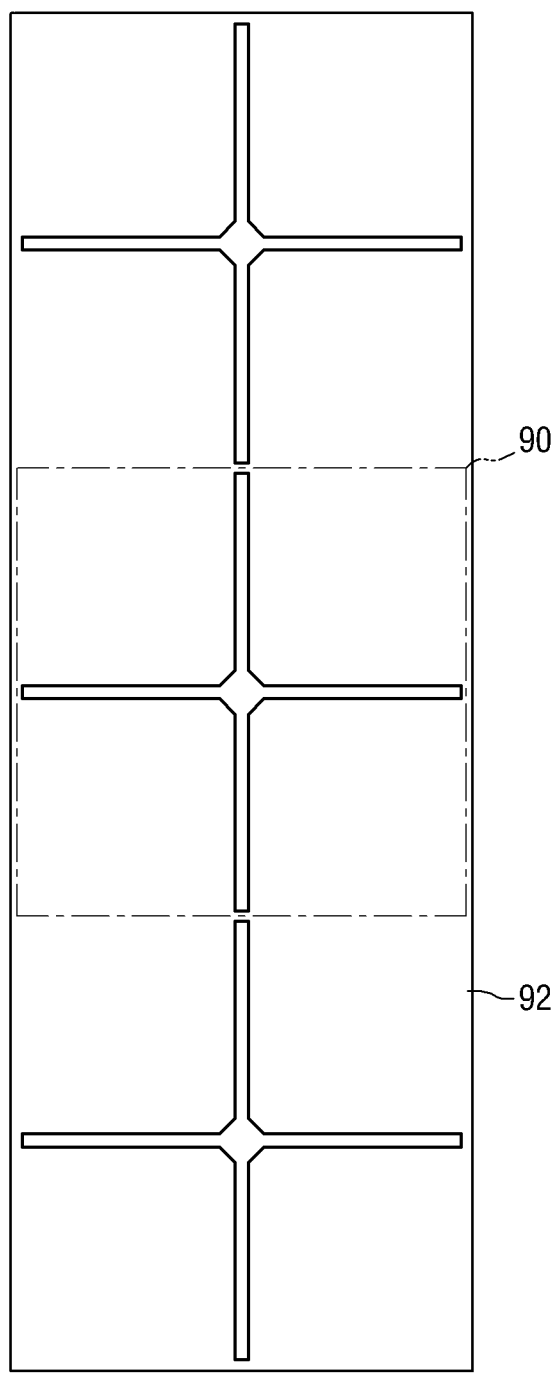
FIG. 6 is a layout diagram of an upper display panel that is coupled to the lower display panel shown in FIG. 2.
Figure 7:
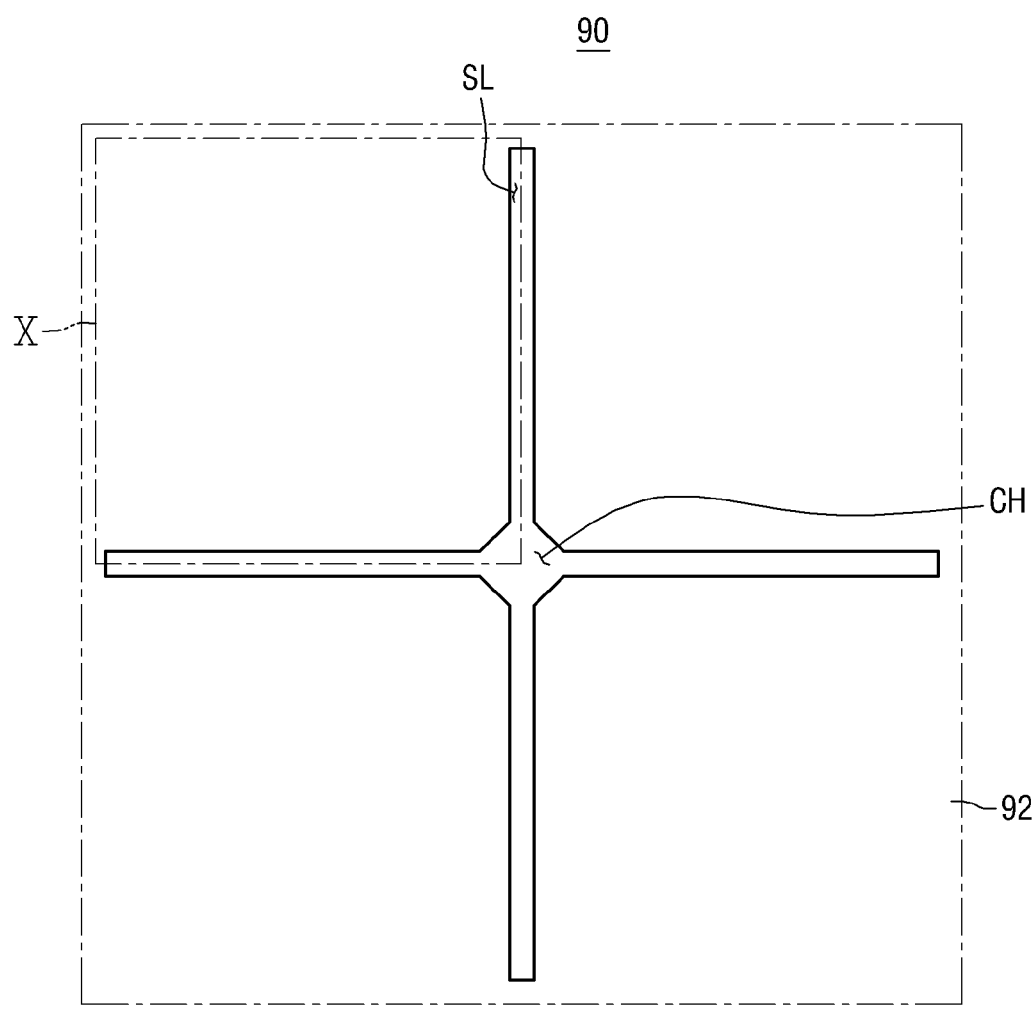
FIG. 7 is an enlarged view of a unit common electrode of the upper display panel shown in FIG. 6.
Figure 8:
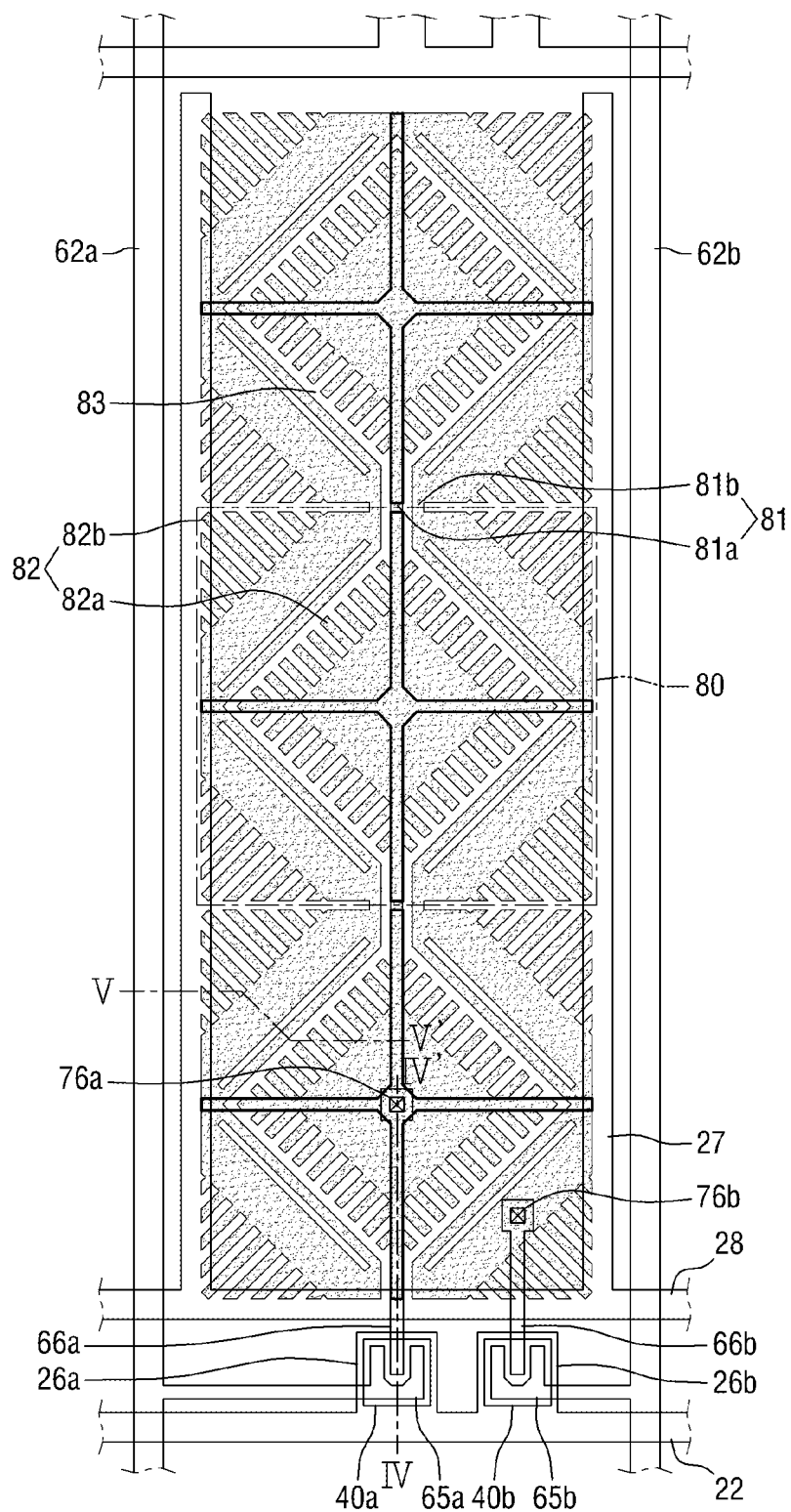
FIG. 8 is a layout diagram of the display device including the lower display panel of FIG. 2 and the upper display panel of FIG. 6.

An upper display panel and display device will now be described with reference to FIGS. 6 through 8. FIG. 6 is a layout diagram of an upper display panel that is coupled to the lower display panel shown in FIG. 2. FIG. 7 is an enlarged view of a unit common electrode 90 of the upper display panel shown in FIG. 6. FIG. 8 is a layout diagram of the display device including the lower display panel of FIG. 2 and the upper display panel of FIG. 6.

A black matrix (not shown) for preventing leakage of light and defining pixel regions may be formed on a substrate (not shown) which may be formed of transparent glass. The black matrix may be disposed in a region on the upper display panel corresponding to the position of a region on the lower display panel defined by a gate line 22, first and second data lines 62a and 62b, and a thin-film transistor. In addition, the black matrix may have various shapes in order to prevent the leakage of light in regions on the upper display panel corresponding to the position of regions on the lower display panel around the first and second subpixel electrodes 82a and 82b and the thin-film transistor. The black matrix may, for example, be formed of metal (metal oxide), such as chrome or chrome oxide, or organic black resist.

Color filters (not shown), for example, red, green and blue color filters, may be arranged sequentially in pixel regions between portions of the black matrix.

An overcoat layer (not shown) may be formed on the color filters in order to planarize a step difference between them.

A common electrode 92 is disposed on the overcoat layer and is formed of a transparent conductive material such as ITO or IZO. The common electrode 92 may be a patterned metal plate.

The common electrode 92 may include a plurality of unit common electrodes 90. The unit common electrodes 90 may overlap the unit pixel electrodes 80, respectively. That is, the unit common electrodes 90 may be the same size as the unit pixel electrodes 80, respectively.

More specifically, referring to FIG. 7, one unit common electrode 90 may include a central hole CH and a plurality of slits SL.

The central hole CH may be positioned on the upper display panel so as to overlap with the position of a center of the plate PL on the lower display panel. In an example embodiment, a center of the central hole CH may be located on the upper display panel so as to overlap with the center of the first plate PL1 on the lower display panel. In addition, the shape of the central hole CH may correspond to the shape of the first plate PL1. In an example embodiment, the central hole CH may be shaped like a quadrangle, more specifically, a diamond.

The slits SL may protrude from the central hole CH. The slits SL may be positioned on the upper display panel so as to overlap the first and second plates PL1 and PL2 and the stems ST on the lower display panel. In an example embodiment, the slits SL may be parallel to the gate line 22 and the first and second data lines 62a and 62b. In other words, the slits SL may be arranged in a cross pattern.

An alignment layer (not shown) which aligns liquid crystal molecules may be coated onto the common electrode 92.

If the lower and upper display panels structured as described above are aligned and coupled to each other, a liquid crystal material may be injected between the panels to complete the basic structure of the display device according to the current embodiment.

In a state where no electric field is applied between the pixel electrode 82 and the common electrode 92, liquid crystal molecules included in the liquid crystal layer are aligned such that their director is perpendicular to the surfaces of the lower display panel and the upper display panel. In addition, the liquid crystal molecules may have negative dielectric constant anisotropy.

The display device is formed by adding elements such as polarizers, a backlight, etc., as are understood by persons of ordinary skill in the art, to this basic structure. The polarizers are respectively placed on both sides of the basic structure such that one of their transmission axes is parallel to the gate line 22 and the other one is perpendicular to the gate line 22.

Figure 9:
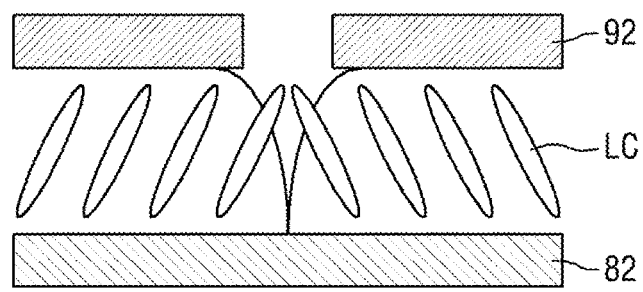
FIG. 9 is a conceptual diagram illustrating the arrangement state of liquid crystal molecules in an opening of a common electrode.
Figure 10:
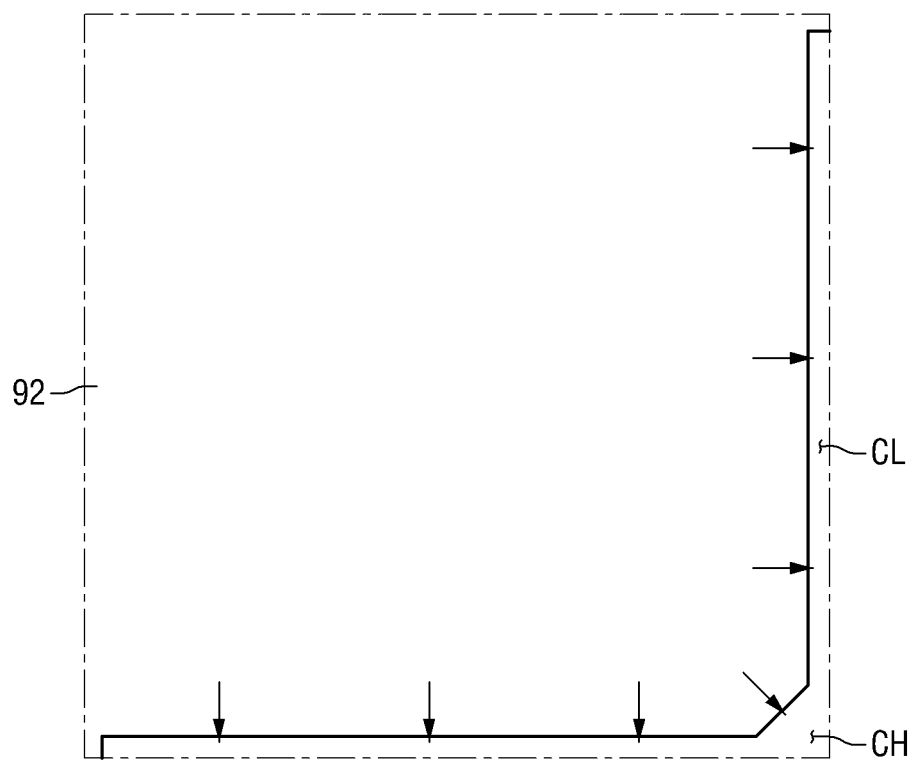
FIG. 10 is an enlarged view illustrating the arrangement state of the liquid crystal molecules in a portion X of FIG. 7.
Figure 11:
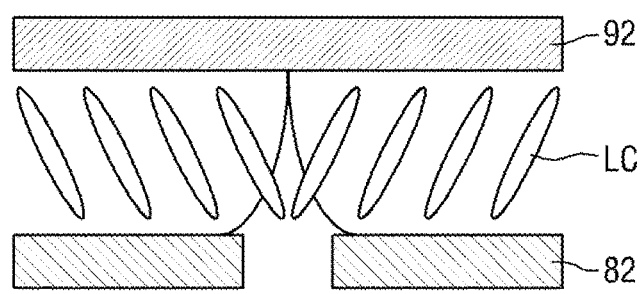
FIG. 11 is a conceptual diagram illustrating the arrangement state of the liquid crystal molecules in an opening of a pixel electrode.
Figure 12:
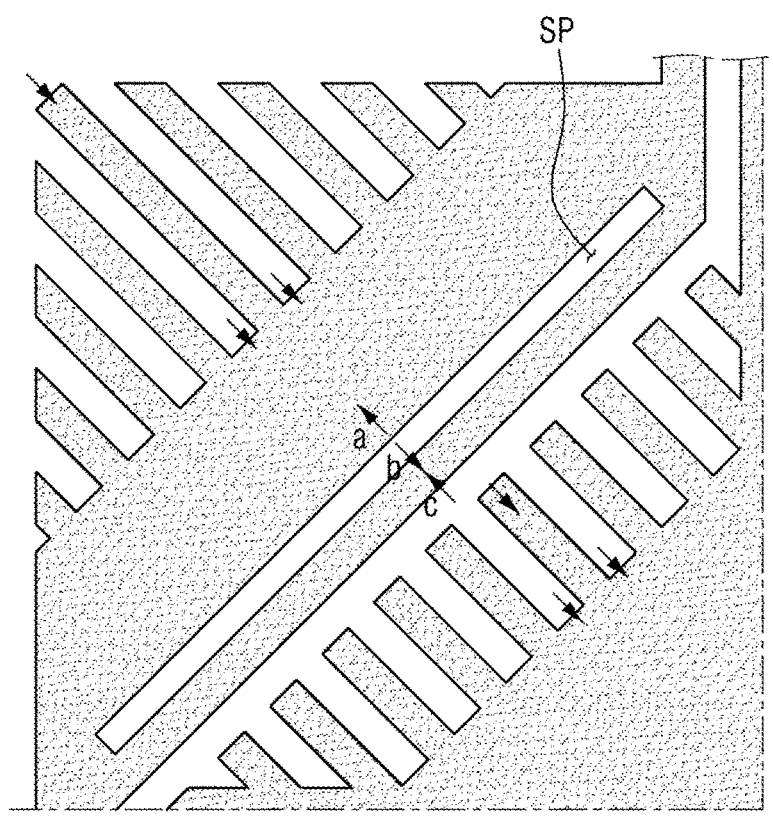
FIG. 12 is an enlarged view illustrating the arrangement state of the liquid crystal molecules in a portion XII of FIG. 3.

While not intending to be bound by a particular theory, the texture-preventing effect of the display device according to the current embodiment will now be described with reference to FIGS. 9 through 12. FIG. 9 is a conceptual diagram illustrating the arrangement state of liquid crystal molecules LC in an opening of the common electrode 92. FIG. 10 is an enlarged view illustrating the arrangement state of the liquid crystal molecules LC in a portion X of FIG. 7. FIG. 11 is a conceptual diagram illustrating the arrangement state of the liquid crystal molecules LC in an opening of the pixel electrode 82. FIG. 12 is an enlarged view illustrating the arrangement state of the liquid crystal molecules LC in a portion XII of FIG. 3.

Referring to FIG. 9, the liquid crystal molecules LC are lying toward an opening (e.g., a slit SL) of the common electrode 92. In other words, the arrangement direction of the liquid crystal molecules LC in the opening of the common electrode 92 is a direction toward the opening.

Accordingly, as indicated by arrows in FIG. 10, the overall arrangement direction of the liquid crystal molecules LC in an upper left part of a unit common electrode 90 is a direction toward a center of the unit common electrode 90.

Referring to FIG. 11, the liquid crystal molecules LC are lying toward an opening (e.g., a slit pattern SP) of the pixel electrode 82. In other words, the arrangement direction of the liquid crystal molecules LC in the opening of the pixel electrode 82 is a direction toward the opening.

Accordingly, as indicated by arrows in FIG. 12, the overall arrangement direction of the liquid crystal molecules LC in an upper left part of a unit pixel electrode 80 is a direction toward a center of the unit pixel electrode 80. However, the liquid crystal molecules LC located at a boundary between the first subpixel electrode 82a and the second subpixel electrode 82b are arranged in a direction opposite to the overall arrangement direction of the liquid crystal molecules LC.

Specifically, if the slit pattern SP does not exist, the liquid crystal molecules LC located at the boundary between the first subpixel electrode 82a and the second subpixel electrode 82b are arranged in a direction opposite to the overall arrangement direction of the liquid crystal molecules LC due to a fringe field c acting in a direction opposite to the direction toward the center of the unit pixel electrode 80. In this case, a fringe field may be a force that determines the arrangement direction of the liquid crystal molecules LC. In particular, the fringe field c is triggered by the second plate PL2 and has a great effect. Accordingly, texture is created between the first subpixel electrode 82a and the second subpixel electrode 82b.

On the other hand, if the slit pattern SP exists as in the display device according to the current embodiment, a fringe field b generated by the slit pattern SP can offset the fringe field c. In addition, another fringe field a generated by the slit pattern SP does not have a great effect because it is triggered by the slit pattern SP. That is, the addition of the slit pattern SP can weaken the fringe field c, thereby suppressing the creation of texture at the boundary between the first subpixel electrode 82a and the second subpixel electrode 82b.

Figure 13:
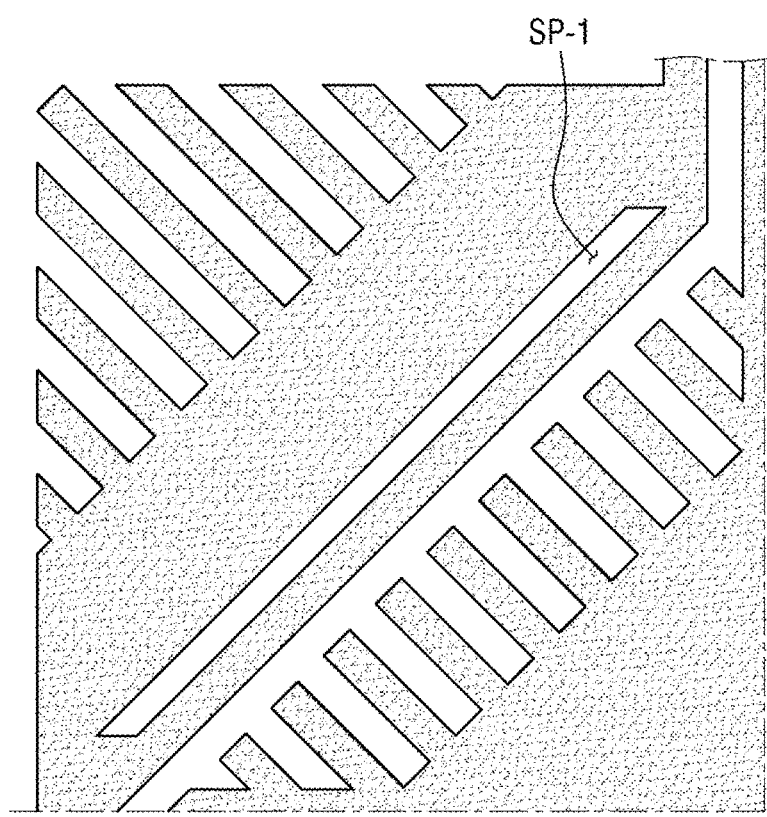
FIG. 13 is a partial enlarged view of a pixel electrode included in a display device according to another embodiment.

FIG. 13 is a partial enlarged view of a pixel electrode 82 included in a display device according to another example embodiment. For convenience of description, elements having identical functions to those of the elements of the previous embodiments (shown in FIGS. 2 through 8) are indicated by the same reference numerals. Thus, a detailed description thereof will be omitted. The current embodiment will hereinafter be described, focusing mainly on differences with the previous embodiments.

Referring to FIG. 13, each of a plurality of slit patterns SP-1 may be shaped like a parallelogram. Specifically, both upper and lower sides of each of the slit patterns SP-1 may be parallel to a gate line 22, and two lateral sides of each of the slit patterns SP-1 may be parallel to an adjacent side of the first plate PL1. However, the present disclosure is not limited thereto. Edges (i.e., both ends) of each of the slit patterns SP-1 can have various shapes.

Figure 14:
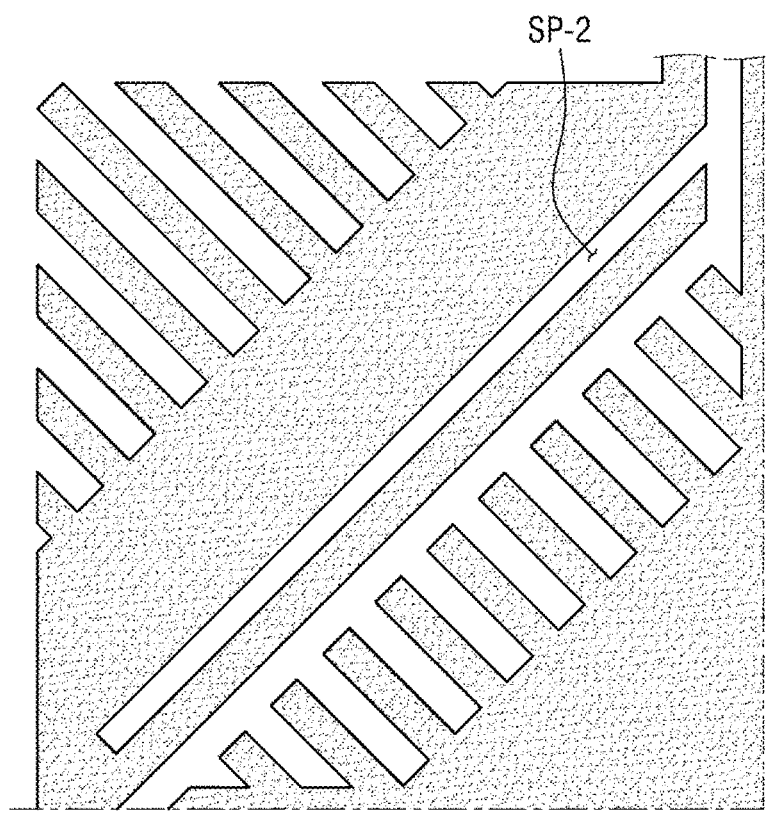
FIG. 14 is a partial enlarged view of a pixel electrode included in a display device according to another embodiment.

FIG. 14 is a partial enlarged view of a pixel electrode 82 included in a display device according to another example embodiment. For convenience of description, elements having identical functions to those of the elements of the previous embodiments (shown in FIGS. 2 through 8) are indicated by the same reference numerals. Thus, a detailed description thereof will be omitted. The current embodiment will hereinafter be described, focusing mainly on differences with the previous embodiments.

Referring to FIG. 14, an end of at least one of a plurality of slit patterns SP-2 may be open. Specifically, a slit pattern SP-2 having an open end may be connected to a gap 83 (as shown in FIG. 3). Here, the open end of the slit pattern SP-2 may be located at a position where a plurality of connecting electrodes 81 (FIG. 3) are located.

A plurality of slit patterns SP-1 or SP-2 can have various shapes as shown in FIGS. 13 and 14.

Figure 15:
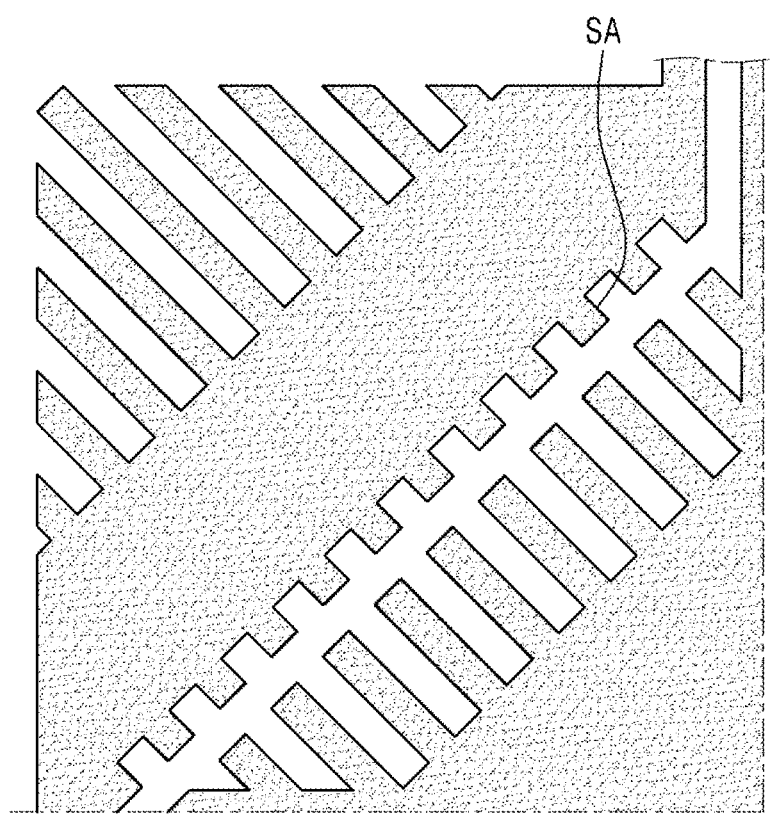
FIG. 15 is a partial enlarged view of a pixel electrode included in a display device according to another embodiment.

FIG. 15 is a partial enlarged view of a pixel electrode 82 included in a display device according to another example embodiment. For convenience of description, elements having identical functions to those of the elements of the previous embodiments (shown in FIGS. 2 through 8) are indicated by the same reference numerals. Thus, a detailed description thereof will be omitted. The current embodiment will hereinafter be described, focusing mainly on differences with the previous embodiments.

Referring to FIG. 15, a second subpixel electrode 82b may include a sawtooth pattern SA instead of slit patterns SP. That is, the second subpixel electrode 82b may include the sawtooth pattern SA formed in a portion thereof which faces a first subpixel electrode 82a. Specifically, the sawtooth pattern SA may be formed in a side of a second plate PL2 which faces a plurality of first branches BR1.

In an example embodiment, a plurality of protrusions of the sawtooth pattern SA may face the first branches BR1, respectively. In another example embodiment, a plurality of recesses of the sawtooth pattern SA may face the first branches BR1, respectively. In another example embodiment, the protrusions of the sawtooth pattern SA may be alternately arranged with the first branches BR1. That is, respective ends of the protrusions of the sawtooth pattern SA and respective ends of the first branches BR1 may be arranged in a zigzag pattern.

Even if the sawtooth pattern SA, instead of the slit patterns SP, is formed in the second subpixel electrode 82b, it is possible to prevent the creation of texture at a boundary between the first subpixel electrode 82a and the second subpixel electrode 82b. Specifically, if a side of the second subpixel electrode 82b (i.e., a side of the second plate PL2) which faces the first subpixel electrode 82a has protrusions and recesses, it can offset or reduce a fringe field acting in a direction opposite to the overall arrangement direction of liquid crystals (a direction toward a center of a unit pixel electrode 80). Therefore, it is possible to suppress, as much as possible, the creation of texture at the boundary between the first subpixel electrode 82a and the second subpixel electrode 82b.

Embodiments of the present disclosure provide an advantage. That is, it is possible to prevent the creation of texture at a boundary between two subpixels.

However, the effects of the present disclosure are not restricted to those set forth herein.

While the present disclosure has been particularly shown and described with reference to example embodiments thereof, it will be understood by those of ordinary skill in the art that various changes in form and details may be made therein without departing from the spirit and scope of the present invention. It is therefore desired that the present embodiments be considered in all respects as illustrative and not restrictive.

What is claimed is:

1. A display device comprising:
   a first substrate;
   a gate wiring formed on the first substrate and extending in a first direction;
   a data wiring insulated from and crossing the gate wiring and extending in a second direction; and
   a pixel electrode comprising a first subpixel electrode to which a first data voltage is applied from the data wiring and a second subpixel electrode to which a second data voltage different from the first data voltage is applied from the data wiring,
   wherein the first subpixel electrode is surrounded by the second subpixel electrode, and the second subpixel electrode comprises a plurality of slit patterns formed in portions thereof which are adjacent to the first subpixel electrode, the plurality of slit patterns substantially surrounding the first subpixel electrode.

2. The display device of claim 1, wherein the first data voltage is higher than the second data voltage.

3. The display device of claim 1, wherein the pixel electrode comprises a plurality of unit pixel electrodes, wherein the first subpixel electrode included in each of the unit pixel electrodes comprises a first plate, a plurality of stems protruding from the first plate and a plurality of first branches protruding from the first plate and the stems, and the second subpixel electrode included in each of the unit pixel electrodes comprises a second plate surrounding the first plate and a plurality of second branches protruding from the second plate on an outer side of the second plate opposite an inner side of the second plate adjacent the first plate.

4. The display device of claim 3, wherein the slit patterns are disposed in portions of the second plate which are adjacent to the first branches.

5. The display device of claim 3, wherein a lengthwise direction of one of the slit patterns is perpendicular to a direction in which first branches adjacent to the slit pattern protrude.

6. The display device of claim 3, wherein each of the slit patterns is shaped like a rectangle or a parallelogram.

7. The display device of claim 3, wherein an end of at least one of the slit patterns is open.

8. The display device of claim 3, wherein the first plate is diamond-shaped, the stems protrude from corners of the first plate, and the first branches are arranged at regular intervals to surround the first plate and the stems.

9. The display device of claim 3, wherein two halves of the second plate are symmetrical with respect to a virtual line that is parallel to the data wiring and passes through a center of the first plate, and the second branches are arranged at regular intervals to surround the second plate.

10. The display device of claim 3, wherein the unit pixel electrodes are arranged in a row in a direction parallel to the data wiring.

11. The display device of claim 3, wherein the pixel electrode further comprises a plurality of connecting electrodes interposed between adjacent unit pixel electrodes, wherein the connecting electrodes comprise:
    a first connecting electrode interposed between adjacent stems; and
    a second connecting electrode interposed between adjacent second plates.

12. The display device of claim 3, further comprising:
    a second substrate facing the first substrate;
    a common electrode disposed on the second substrate; and
    a liquid crystal layer interposed between the first substrate and the second substrate,
    wherein the common electrode comprises a plurality of unit common electrodes corresponding to the unit pixel electrodes, respectively, and each of the unit common electrodes comprises a central hole overlapping the center of the first plate and a plurality of slits protruding from the central hole and overlapping the stems.

13. A display device comprising:
    a first substrate;
    a gate wiring formed on the first substrate and extending in a first direction;
    a data wiring insulated from and crossing the gate wiring and extending in a second direction; and
    a pixel electrode comprising a plurality of unit pixel electrodes which are disposed in a region defined by the gate wiring and the data wiring,
    wherein each of the unit pixel electrodes comprises:
      a first subpixel electrode comprising a first plate, a plurality of stems which protrude from the first plate, and a plurality of first branches which protrude from the first plate and the stems; and
      a second subpixel electrode comprising a second plate which surrounds the first plate and a plurality of second branches which protrude from the second plate in a direction opposite to a direction in which the first plate is disposed,
    wherein a first data voltage is applied from the data wiring to the first subpixel electrode, a second data voltage different from the first data voltage is applied from the data wiring to the second subpixel electrode, and the second plate comprises a plurality of slit patterns formed in portions thereof which are adjacent to the first branches, and wherein the slit patterns substantially surround the first subpixel electrode.

14. The display device of claim 13, wherein the first data voltage is higher than the second data voltage.

15. A display device comprising:
    a first substrate;
    a gate wiring formed on the first substrate and extending in a first direction;
    a data wiring insulated from and crossing the gate wiring and extending in a second direction; and
    a pixel electrode comprising a first subpixel electrode to which a first data voltage is applied from the data wiring and a second subpixel electrode to which a second data voltage different from the first data voltage is applied from the data wiring, wherein the first subpixel electrode is surrounded by the second subpixel electrode, and the second subpixel electrode comprises a sawtooth pattern formed in portions thereof which face the first subpixel electrode.

16. The display device of claim 15, wherein the first data voltage is higher than the second data voltage.

17. The display device of claim 15, wherein the pixel electrode comprises a plurality of unit pixel electrodes, wherein the first subpixel electrode included in each of the unit pixel electrodes comprises a first plate, a plurality of stems protruding from the first plate and a plurality of first branches protruding from the first plate and the stems, and the second subpixel electrode included in each of the unit pixel electrodes comprises a second plate surrounding the first plate and a plurality of second branches protruding from the second plate on an outer side of the second plate opposite an inner side of the second plate adjacent the first plate.

18. The display device of claim 17, wherein the sawtooth pattern is disposed in portions of the second plate which are adjacent to the first branches.

19. The display device of claim 1, wherein the second subpixel electrode has a plurality of branches forming its outer edges, and wherein the plurality of slit patterns extend in a direction that is substantially perpendicular to the plurality of branches.

* * * * *